United States Patent
Gu (10) Patent No.: US 11,074,436 B1
(45) Date of Patent: Jul. 27, 2021

(54) METHOD AND APPARATUS FOR FACE RECOGNITION

(71) Applicant: Shenzhen Intellifusion Technologies Co., Ltd., Guangdong (CN)

(72) Inventor: Peng Gu, Guangdong (CN)

(73) Assignee: SHENZHEN INTELLIFUSION TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/253,636

(22) PCT Filed: Oct. 30, 2019

(86) PCT No.: PCT/CN2019/114328
§ 371 (c)(1),
(2) Date: Dec. 18, 2020

(87) PCT Pub. No.: WO2020/134527
PCT Pub. Date: Jul. 2, 2020

(30) Foreign Application Priority Data

Dec. 29, 2018 (CN) .......................... 201811640270.3

(51) Int. Cl.
*G06K 9/00* (2006.01)
*G06K 9/62* (2006.01)

(52) U.S. Cl.
CPC ..... *G06K 9/00288* (2013.01); *G06K 9/00268* (2013.01); *G06K 9/00744* (2013.01); *G06K 9/6202* (2013.01); *G06K 9/6215* (2013.01)

(58) Field of Classification Search
CPC ........... G06K 9/00288; G06K 9/00744; G06K 9/6215; G06K 9/00268; G06K 9/6202
See application file for complete search history.

(56) References Cited

U.S. PATENT DOCUMENTS

| | | | |
|---|---|---|---|
| 2011/0310237 A1* | 12/2011 | Wang | H04N 7/18 348/77 |
| 2019/0138794 A1* | 5/2019 | Huang | G06K 9/00315 |
| 2019/0138797 A1* | 5/2019 | Huang | G06K 9/00335 |
| 2019/0272415 A1* | 9/2019 | Miao | G06K 9/00288 |
| 2020/0410280 A1* | 12/2020 | Wu | G06F 16/583 |

FOREIGN PATENT DOCUMENTS

CN 108090420 A 5/2018

* cited by examiner

*Primary Examiner* — Aaron W Carter (57) ABSTRACT

Disclosed are a method and an apparatus for face recognition. The method includes: acquiring a target face image in a video monitoring device (S101); comparing the target face image with a first category image in a static library to a first similarity (S102); when the first similarity is less than a first predetermined threshold, determining whether there is a backup face image whose similarity with the target face image that is greater than a second predetermined threshold (S103); if yes, determining whether there is a dynamic image corresponding to the backup face image in a dynamic library (S104); and if yes, determining that matching is successful (S105). The invention improves the precision of face recognition.

10 Claims, 5 Drawing Sheets

METHOD AND APPARATUS FOR FACE RECOGNITION

CROSS-REFERENCE TO RELATED APPLICATION

This application claims priority to Chinese Patent Application No. 201811640270.3, entitled "METHOD AND APPARATUS FOR FACE RECOGNITION" and filed on Dec. 29, 2018, the content of which is hereby incorporated by reference in its entirety.

BACKGROUND

Technical Field

The present disclosure generally relates to mobile terminals field, and especially relates to a method and an apparatus for face recognition.

Description of Related Art

Nowadays, in an age of human connection, services for people first have to solve a problem how to identity recognition. As an important way of identity recognition, face recognition is widely used in public security such as finances, airports, subways, frontier ports and other important fields where it is needed to naturally compare and recognize people's identity.

Most current face recognition technologies are achieved for face comparison by using a static database and video capture. However, missing recognition is easily occurred when considerable differences are existed between static images and dynamic faces.

SUMMARY

The technical problems to be solved: in view of the shortcomings of the related art, the present disclosure relates to a method and an apparatus for face recognition which can improve an accuracy of face recognition and reduce a false recognition rate.

The technical solution adopted for solving technical problems of the present disclosure is:

in a first aspect, a method for face recognition of the present disclosure includes:

acquiring a target face image in a video monitoring device;

comparing the target face image with a first category image in a static library to obtain a first similarity value;

when the first similarity value is less than a first preset threshold, determining whether there is a backup face image existed in the static library whose similarity with the target face image is greater than a second preset threshold;

if the backup face image is existed in the static library, determining whether a dynamic image corresponding to the backup face image is existed in a dynamic library;

if the dynamic image corresponding to the backup face image is existed in the dynamic library, determining a match to be successful.

Optionally, the step of acquiring a target face image in a video monitoring device, includes:

when it is detected that a person appears in the video monitoring device, performing face recognition on the person;

selecting one face, with a quality exceeding a preset threshold, from a plurality of recognized faces for feature extraction to obtain the target face image.

Optionally, the step of if the dynamic image corresponding to the backup face image is existed in the dynamic library, determining a match to be successful, includes:

if the dynamic image corresponding to the backup face image is existed in the dynamic library and a matching degree between the backup face image and the dynamic image is greater than a third preset threshold, determining the match to be successful.

Optionally, a size of the face in the dynamic image is exceeded the first threshold and the face is positioned in a positive face posture.

Optionally, the method for face recognition further includes:

when the first similarity value is greater than the first preset threshold, determining the match to be successful;

determining information of the person in the target face image according to the matched face image, and outputting the information of the person in the target face image.

In a second aspect, an apparatus for face recognition according to an embodiment of the present disclosure, which is characterized in that the apparatus includes:

an acquiring unit configured to acquire a target face image in a video monitoring device;

a comparing unit configured to compare the target face image with a first category image in a static library to obtain a first similarity value;

a judging unit configured to determine whether there is a backup face image existed in the static library whose similarity with the target face image is greater than a second preset threshold, when the first similarity value is less than a first preset threshold;

the judging unit further configured to determine whether a dynamic image corresponding to the backup face image is existed in a dynamic library, if the backup face image is existed in the static library; and a determining unit configured to determine a match to be successful, if the dynamic image corresponding to the backup face image is existed in the dynamic library.

Optionally, the acquiring unit is configured to perform face recognition on a person, when it is detected that the person appears in the video monitoring device, and select one face, with a quality exceeding a preset threshold, from a plurality of recognized faces for feature extraction to obtain the target face image.

Optionally, the determining unit is configured to determine the match to be successful, if the dynamic image corresponding to the backup face image is existed in the dynamic library and a matching degree between the backup face image and the dynamic image is greater than a third preset threshold.

Optionally, a size of the face in the dynamic image is exceeded the first threshold and the face is positioned in a positive face posture.

Optionally, the apparatus for face recognition further includes an output unit;

the determining unit further configured to determine the match to be successful when the first similarity value is greater than the first preset threshold, and determine information of the person in the target face image according to the matched face image; and the output unit configured to output the information of the person in the target face image.

In a third aspect, a mobile terminal according to an embodiment of the present disclosure includes a processor, a memory, a communication interface and one or more programs stored in the memory and performed by the processor, the one or more programs include instructions performed by the processor to implement steps of the method for face recognition in the first aspect of the present disclosure above mentioned.

In a fourth aspect, a readable storage medium according to an embodiment of the present disclosure is provided for storing computer programs for electrical data interchange, wherein the computer programs are performed by a computer to implement some or all steps of the method for face recognition above mentioned, and the computer includes a mobile terminal.

In a fifth aspect, a computer program product according to an embodiment of the present disclosure is provided and includes a non-instantaneous computer readable storage medium for storing computer programs, wherein the computer programs are performed by a computer to implement some or all steps of the method for face recognition above mentioned. The computer program product can be a software installation package, and the computer includes a mobile terminal.

It can be seen that embodiments of the present disclosure disclose, acquiring a target face image in a video monitoring device; comparing the target face image with a first category image in a static library to obtain a first similarity value; when the first similarity value is less than a first preset threshold, determining whether there is a backup face image existed in the static library whose similarity with the target face image is greater than a second preset threshold; if the backup face image is existed in the static library, determining whether a dynamic image corresponding to the backup face image is existed in a dynamic library; and if the dynamic image corresponding to the backup face image is existed in the dynamic library, determining a match to be successful, which can improve an accuracy of face recognition and reduce a false recognition rate.

BRIEF DESCRIPTION OF THE DRAWINGS

A brief description to the drawings used in detailed description of embodiments hereinafter is provided thereof.

DETAILED DESCRIPTION

Figure 1A:
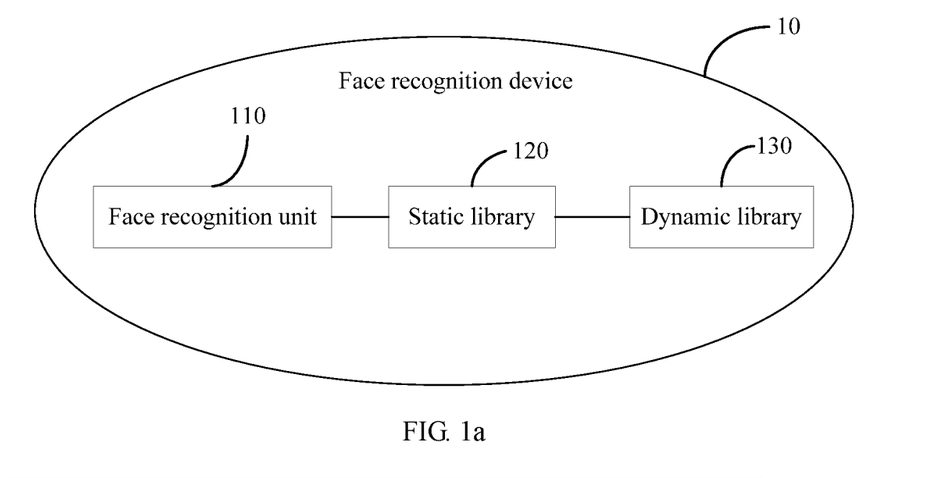
FIG. 1a is a schematic diagram of an apparatus for face recognition in accordance with an embodiment of the present disclosure.

Referring to FIG. 1, an apparatus for face recognition 10 in accordance with an embodiment of the present disclosure, includes: a face recognition unit 110, a static library 120 and a dynamic library 130.

Furthermore, the static library 130 is configured to store static pictures, such as identity document (ID) photos, life photos, etc. It is understood that a static picture refers to a picture with static content therein, such as a joint photographic group (JPG) image, a joint photographic experts group (JPEG) image, or a portable network graphics (PNG) image, etc. The dynamic library 130 is configured to store dynamic pictures of persons. It is understandable that the dynamic pictures refer to pictures that include actions therein, such as graphics interchange format (GIF) images. For example, a ten-second character dynamic picture in which the character stands upright with his face straight for the first five seconds and then moves like squat, turn and jump. It should be pointed out that: acquiring a face image, if image features of the face image are matched with image features of face images in the static library 130 to obtain a similarity less than a first preset threshold, dynamic images in the dynamic library 120 should be used for as auxiliary recognition.

Figure 1B:
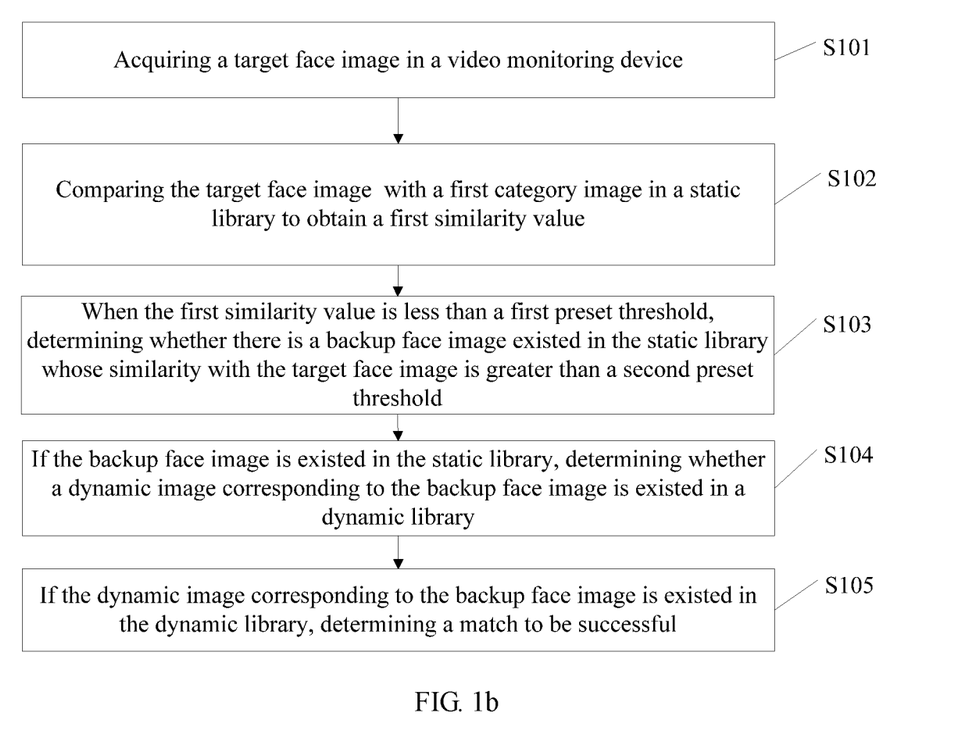
FIG. 1b is a flowchart of a method for face recognition in accordance with a first embodiment of the present disclosure.

Specifically, a detail description is provided by combining with FIG. 1a. FIG. 1b illustrates a flowchart of a method for face recognition in accordance with a first embodiment of the present disclosure which is used for an electronic device. The method for face recognition includes:

S101, acquiring a target face image in a video monitoring device;

furthermore, it should be pointed out that the apparatus for face recognition 10 is provided as an executor of an embodiment of the present disclosure. The video monitoring device can be a part of the apparatus for face recognition 10, or can be an independent device.

Furthermore, it should be pointed out that the step of acquiring a target face image in a video monitoring device, includes: when it is detected that a person appears in the video monitoring device, performing face recognition on the person; and selecting one face, with a quality exceeding a preset threshold, from a plurality of recognized faces for feature extraction to obtain the target face image.

For example, the apparatus for face recognition first captures a video, and when it is detected that the person appears in the video, it is taken a screenshot of the video containing the person's face. Acquiring a plurality of screenshots of the video containing the person's face, sorting the plurality of screenshots according to a quality of face images in each screenshot and taking a first image with the first ranking as a target face image. Dimensions of the quality include whether the face in the face image is positive or not, and whether the face image is clear.

S102, comparing the target face image with a first category image in a static library to obtain a first similarity value;

for example, the first category image is ID photos stored in the static library. It can be understood that, the person can have one or more ID photos. When there is a plurality of ID photos, performing quality sorting on the plurality of ID photos according to pixels, clarity and other parameters of the ID photo. The first image is an image with the first ranking.

It is understandable that the comparison of the target face image with the first category image in the static library (that is, the comparison with the image with the first ranking) can determine whether it is success of the comparison with the fastest speed. If the comparison is successful, a comparison result can be directly fed back so that such rapid response can improve users' experience.

For example, in order to ensure the quality of the photos in the static library, a resolution of the photo in the static library is required to be larger than a preset resolution (such as 1024*768), and a face avatar is accounted for at least one third of the image.

In addition, it should be pointed out that the target face image is compared with the first category image in the static library, including: comparing image features in the target face image with image features in the first category image in the static library.

For example, face features in the target face image can be compared with face features in the first category of image in the static library.

For example, a matching process includes face image feature extraction and image feature matching. Specifically, the face feature extraction is performed based on some features of the face. The face feature extraction, also called face representation, is a process of modeling face features. The method of face feature extraction can be divided into two categories: one is knowledge-based representation, and the other is representation based on algebraic characterization or statistical learning. The knowledge-based representation method is mainly used to obtain feature data conducive to face classification based on a shape description of face organs and a distance between the face organs, its characteristic components usually include an Euclidean distance, a curvature and an angle between characteristic points. A face is consisted of a pair of eyes, a nose, a mouth, a chin and other parts, so that a geometric description of these parts and structural relations between them can be used as an important feature for face recognition, and these features are called geometric features. The knowledge-based face representation mainly includes a geometric feature-based method and a template matching method. Face image feature matching refers to perform search and match on feature data extracted from the face image and a feature template stored in the database, by setting a threshold, outputting the matching result when a similarity exceeds the threshold. The face recognition is to compare face features to be recognized with an obtained face feature template to judge identity information of the face according to a degree of similarity.

For example, the static library can include a plurality of collections of images. Each collection of images is themed around a character, such as a collection of images 1 is a collection of photos belonging to Xiao A. The ID photos are the first category image with the first ranking. The collection of photos of Xiao A will also include life photos of Xiao A at different ages or in different places. Of course, except for the first category photos, other photos are sorted by photo quality (the photo quality includes pixels, faces, etc.)

S103, when the first similarity value is less than a first preset threshold, determining whether there is a backup face image existed in the static library whose similarity with the target face image is greater than a second preset threshold;

wherein, it is understandable that the first preset threshold is greater than the second preset threshold.

For example, the first preset threshold is 95% and the second preset threshold is 80%.

For another example, the first threshold is 98%, and the second threshold is 85%. Furthermore, the first preset threshold and the second preset threshold can be set manually or by default. Of course, they can also be determined by simulation.

Furthermore, it is understandable that the backup face image is the images ranked from the second to Nth, wherein, N is a positive integer greater than 2, and N can be set by users or default.

It is understandable that if the similarity between the target face image and the first category image in the static library is less than the first preset threshold, it is needed to try to compare the target face image with those images ranked from the second to Nth. If the target face image is compared with the images ranked from the second to Nth to obtain a similarity which is greater than the second preset threshold, it is indicated that the images ranked from the second to Nth are likely to match with the target face image. In order to further determine whether they are matched with each other, dynamic images can be introduced for auxiliary recognition, so as to improve the accuracy of matching.

For example, for a user A, the static library stores ten face photos of the user A which include ID photos, daily life photos and so on. Comparing the target face image with the ten face photos of the user A one by one so as to obtain ten similarity values, and determining whether there are any images whose similarity value exceeds the first preset threshold. If not, then comparing the target face image with the ten face photos of the user A one by one to determine whether there are any images whose similarity exceeds the second preset threshold. If yes, proceeding to step S104, if not, returning recognition failure.

Optionally, the method also includes: when the first similarity value is greater than the first preset threshold, determining the match to be successful; determining information of the person in the target face image according to the matched face image, and outputting the information of the person in the target face image.

S104, if the backup face image is existed in the static library, determining whether a dynamic image corresponding to the backup face image is existed in a dynamic library;

It is understandable that the backup face image can be matched with the dynamic image in the dynamic library. If the match is successful, it is determined that there is a dynamic image corresponding to the backup face image.

For example, if the backup face image is existed in the static library, determining whether a dynamic image corresponding to the backup face image is existed in the dynamic library.

In addition, it is understandable that a size of the face in the dynamic image is exceeded the first threshold and the face is positioned in a positive face posture. The first threshold is a quarter or a third of the size of a face image. Of course, the size of the face can be marked by an area, or can be measured by a length of a person's face, for example, a ratio of the length of the face to a length of the image.

Optionally, the positive face of the face image in the dynamic image can be required to be continuous for N seconds. N is a positive number greater than zero.

S105, if the dynamic image corresponding to the backup face image is existed in the dynamic library, determining a match to be successful.

Optionally, the step of if the dynamic image corresponding to the backup face image is existed in the dynamic library, determining a match to be successful, includes: if the dynamic image corresponding to the backup face image is existed in the dynamic library and a matching degree between the backup face image and the dynamic image is greater than a third preset threshold, determining the match to be successful.

Furthermore, the third threshold can be set manually or by default.

In addition, it should be pointed out that the dynamic images in the dynamic library can be entered in advance or after the matching fails.

For example, when the face matching is failed, the user can be prompted to move closer to a camera through a screen, "Please keep your face straight for N seconds . . . ", the dynamic image is stored in a library after recording the dynamic image. After the successful entry, the correlation between the face static image and the dynamic library can be established.

For example, taking a facial-recognition attendance machine which includes a camera.

a) taking a selfie photo of Zhang San five years ago (such as the photo is beautified), and storing the selfie photo in the library via a backstage supporter, thereby a static image of Zhang San is existed in the static library;

b) when Zhang San is checking on work attendance, because a camera position of the facial-recognition attendance machine is far away and his face posture is not very good, so that he cannot be matched with the static image of Zhang San five years ago. At this time, Zhang San can find that his attendance information isn't recorded via a TV screen;

c) when Zhang San found that his attendance is failed, he would stand in front of the camera with his face straight to take a clear dynamic image (face quality is very good at this time, which can be matched with the static image of Zhang San five years ago), thereby the TV screen can prompt Zhang San to enter the database dynamically;

d) when Zhang San goes through the camera later, although his face images captured by the camera are not good (postures, small faces, etc.), a certain degree of similarity is between his face image with the static image of Zhang San (between the first threshold and the second threshold). At this time, there can be other faces (such as Li Si) in this interval with a certain degree of similarity;

e) here a dynamic storage is come into play, for example, during the first threshold and the second threshold, selecting three static images including Zhang San, Li Si and Wang Wu, then, finding a corresponding dynamic image according to the three static images. Since the dynamic image is a high-quality face photo taken recently, Zhang San is easy to obtain a successful comparison.

Furthermore, the apparatus for face recognition can connect to a police station's server and be configured to download a photo of a wanted criminal from the police station's server and trigger an alarm, if a face image obtained is matched with the photo of the wanted criminal sent by the police.

Of course, the apparatus for face recognition can also be configured to obtain the photos of lost population, and then match the acquired face images with the photos of the lost population. If the acquired face image is successfully matched with the photo of the lost population, a mobile track of the lost population can be monitored, and an alarm can also be triggered.

It can be seen that an embodiment of the present disclosure discloses, acquiring a target face image in a video monitoring device; comparing the target face image with a first category image in a static library to obtain a first similarity value; when the first similarity value is less than a first preset threshold, determining whether there is a backup face image existed in the static library whose similarity with the target face image is greater than a second preset threshold; if the backup face image is existed in the static library, determining whether a dynamic image corresponding to the backup face image is existed in a dynamic library; and if the dynamic image corresponding to the backup face image is existed in the dynamic library, determining a match to be successful, which can improve an accuracy of face recognition and reduce a false recognition rate.

Figure 2:
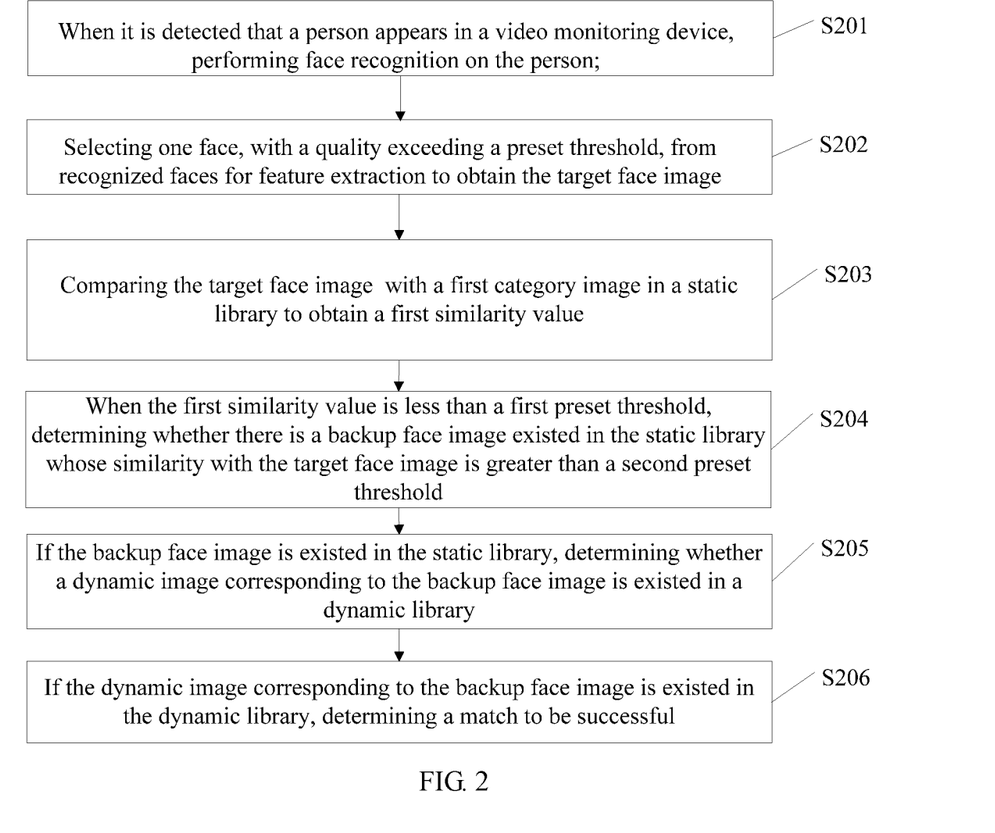
FIG. 2 is a flowchart of a method for face recognition in accordance with a second embodiment of the present disclosure.

A method for face recognition shown in FIG. 2 is consistent with the embodiment shown in FIG. 1b. FIG. 2 illustrates a flowchart of a method for face recognition in accordance with a second embodiment of the present disclosure, which is applied for an electronic device. The method for face recognition includes:

S201, when it is detected that a person appears in a video monitoring device, performing face recognition on the person;

S202, selecting one face, with a quality exceeding a preset threshold, from a plurality of recognized faces for feature extraction to obtain the target face image;

S203, comparing the target face image with a first category image in a static library to obtain a first similarity value;

S204, when the first similarity value is less than a first preset threshold, determining whether there is a backup face image existed in the static library whose similarity with the target face image is greater than a second preset threshold;

S205, if the backup face image is existed in the static library, determining whether a dynamic image corresponding to the backup face image is existed in a dynamic library;

S206, if the dynamic image corresponding to the backup face image is existed in the dynamic library, determining a match to be successful.

It can be seen that an embodiment of the present disclosure discloses: selecting a face image with a quality exceeding the preset threshold from the a plurality of detected face images for feature extraction to obtain the target face image, which can ensure a quality of an original image, and facilitate a subsequent face matching so as to provide a foundation for a subsequent high accuracy and a low error recognition rate.

Figure 3:
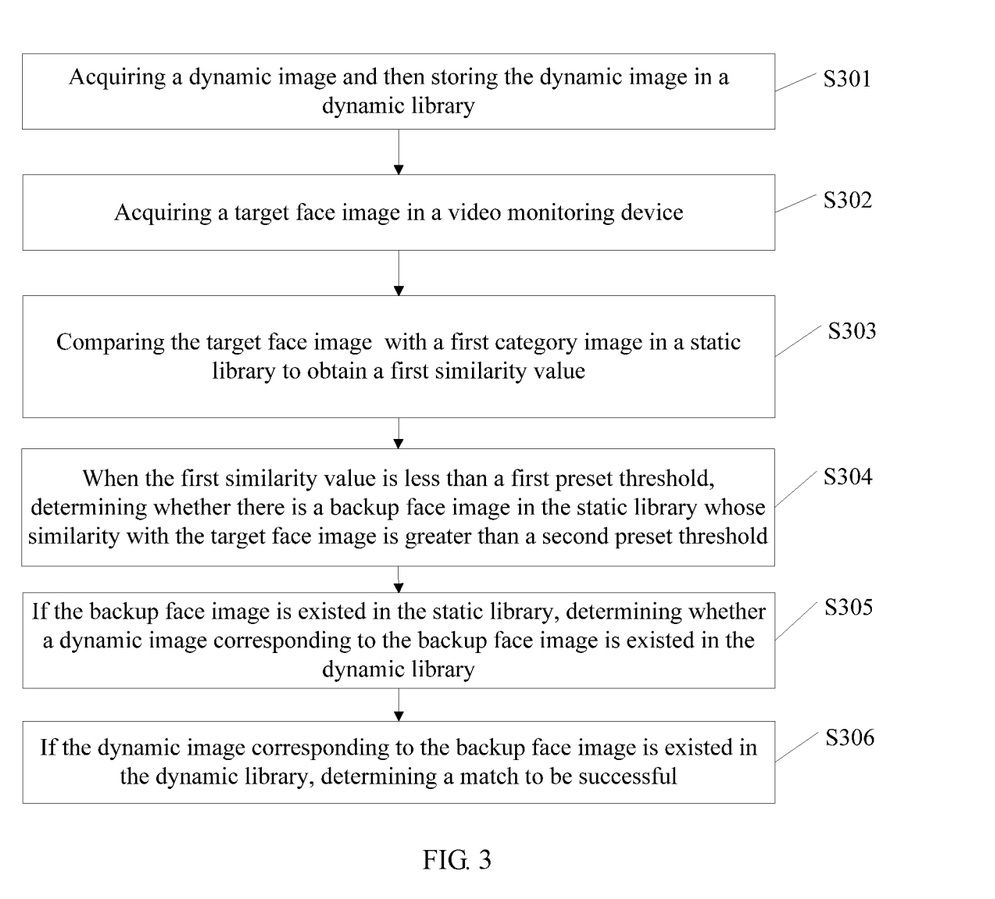
FIG. 3 is a flowchart of a method for face recognition in accordance with a third embodiment of the present disclosure.

A method for face recognition shown in FIG. 3 is consistent with the embodiment shown in FIG. 1b. FIG. 3 illustrates a flowchart of a method for face recognition in accordance with a third embodiment of the present disclosure, which is applied for an electronic device. The method for face recognition includes:

S301, acquiring a dynamic image and then storing the dynamic image in a dynamic library;

wherein, a size of the face in the dynamic image is exceeded the first threshold and the face is positioned in a positive face posture. Furthermore, the positive face of the character in the dynamic image can last for at least N seconds, wherein N is a natural number greater than one. For example, N is two or three or four seconds and so on, which isn't limited in here.

S302, acquiring a target face image in a video monitoring device;

It is understandable that the video monitoring device can be installed in densely populated areas such as railway stations, airports, intersections and pedestrian streets. Of course, it can also be installed in hospitals, schools, governments and other places. The video monitoring device can be configured to upload recorded videos to the server periodically or irregularly. The apparatus for face recognition is played as an implementation body of the embodiment of the present disclosure, which can be configured to read videos from the server, of course, it can also directly be configured to receive the videos sent by the video monitoring device, and then obtain the target face image from the videos.

S303, comparing the target face image with a first category image in a static library to obtain a first similarity value;

S304, when the first similarity value is less than a first preset threshold, determining whether there is a backup face image existed in the static library whose similarity with the target face image is greater than a second preset threshold;

S305, if the backup face image is existed in the static library, determining whether a dynamic image corresponding to the backup face image is existed in a dynamic library;

S306, if the dynamic image corresponding to the backup face image is existed in the dynamic library, determining a match to be successful.

It can be seen that an embodiment of the present disclosure discloses: providing a dynamic library for storing high-quality dynamic images to assist face recognition, thus improving the accuracy of face recognition and reducing the rate of false recognition.

Figure 4:
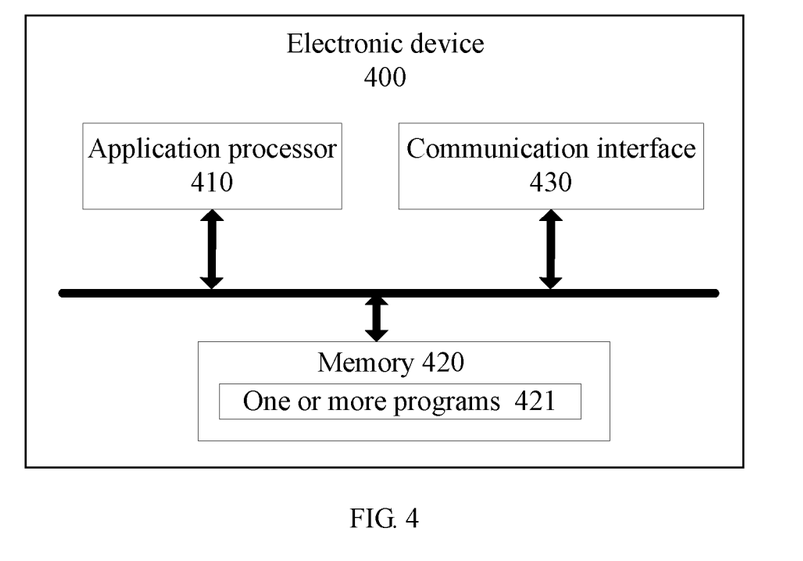
FIG. 4 is a schematic diagram of an electronic device in accordance with an embodiment of the present disclosure.

FIG. 4 illustrates a schematic diagram of an electronic device in accordance with an embodiment of the present disclosure. The electronic device 400 can be configured for face recognition, such as performing the methods for face recognition corresponding to any of the attached drawings in FIGS. 1-3. Referring to FIG. 4, the electronic device 400 includes an application processor 410, a memory 420, a communication interface 430 and one or more programs 421 stored in the memory 420 and performed by the processor 410. The one or more programs 421 include instructions performed by the processor 410 to implement the following steps:

acquiring a target face image in a video monitoring device;

comparing the target face image with a first category image in a static library to obtain a first similarity value;

when the first similarity value is less than a first preset threshold, determining whether there is a backup face image existed in the static library whose similarity with the target face image is greater than a second preset threshold;

if the backup face image is existed in the static library, determining whether a dynamic image corresponding to the backup face image is existed in a dynamic library;

if the dynamic image corresponding to the backup face image is existed in the dynamic library, determining a match to be successful.

Wherein, optionally, the step of acquiring a target face image in a video monitoring device, includes:

when it is detected that a person appears in the video monitoring device, performing face recognition on the person;

selecting one face, with a quality exceeding a preset threshold, from a plurality of recognized faces for feature extraction to obtain the target face image.

Furthermore, optionally, the step of if the dynamic image corresponding to the backup face image is existed in the dynamic library, determining a match to be successful, includes:

if the dynamic image corresponding to the backup face image is existed in the dynamic library and a matching degree between the backup face image and the dynamic image is greater than a third preset threshold, determining the match to be successful.

Furthermore, it should be pointed out that a size of the face in the dynamic image is exceeded the first threshold and the face is positioned in a positive face posture.

Furthermore, optionally, the method further includes:

when the first similarity value is greater than the first preset threshold, determining the match to be successful;

determining information of the person in the target face image according to the matched face image, and outputting the information of the person in the target face image.

It can be seen from the above that an electronic device is provided according to an embodiment of the present disclosure for: acquiring a target face image in a video monitoring device; comparing the target face image with a first category image in a static library to obtain a first similarity value; when the first similarity value is less than a first preset threshold, determining whether there is a backup face image existed in the static library whose similarity with the target face image is greater than a second preset threshold; if the backup face image is existed in the static library, determining whether a dynamic image corresponding to the backup face image is existed in a dynamic library; and if the dynamic image corresponding to the backup face image is existed in the dynamic library, determining a match to be successful, which is beneficial to combine users' face for dynamically capturing information, assist a static face image database to perform comparison, and improve the accuracy of face recognition.

The scheme of embodiments of the present disclosure is introduced mainly from an execution process of the methods. It is understood that electronic device can contain hardware structures and/or software modules in order to perform the above functions. One of ordinary skill in the related art can be readily aware that the present disclosure can be implemented in the form of hardware or a combination of hardware and computer software, combined with units and algorithm steps of each example described in the embodiments provided in this article. Whether a function is implemented in the way of hardware or computer software driving hardware depends on a specific application of the technical scheme and design constraints. Technical professionals can implement the described functions of each particular application by using different methods, which is within the protection scope of the present disclosure.

The functional units of the electronic device of the present disclosure can be divided according to the above method examples, for example, functional units can be divided into corresponding functions, or two or more functions can be integrated into a single processing unit. The integrated units mentioned above can be realized in the form of hardware or software functional units. It should be noted that a division of units in the embodiment of the present disclosure is schematic and is only a logical function division way, and can be another division method in the actual implementation.

It should be noted that the apparatus for face recognition described in the embodiment of the present disclosure is presented as a functional unit. The term "unit" used here should be understood to have the widest possible meaning, and the object that implements the functions described by each "unit" may be an integrated circuit: an application specific integrated circuit (ASIC), for example, a single circuit, used to perform one or more software or firmware program processors (shared, dedicated, or chipsets) and memories, combinational logic circuits, and/or the provision of realizing the functions of the other components.

Figure 5:
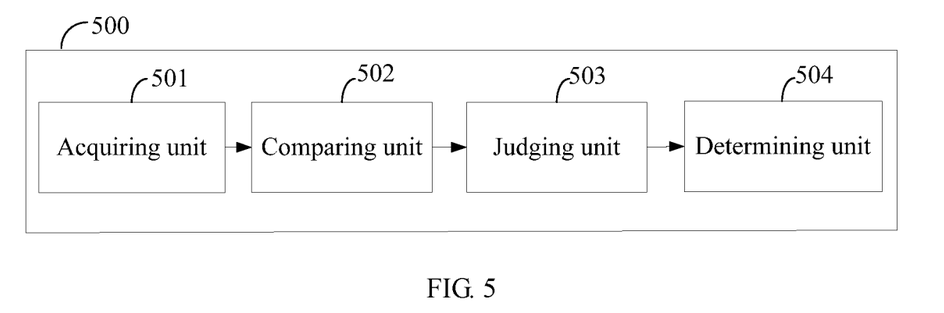
FIG. 5 is a block diagram of functional units of the apparatus for face recognition in accordance with a first embodiment of the present disclosure.

Referring to FIG. 5, an apparatus for face recognition 500 according to a first embodiment of the present disclosure, includes:

an acquiring unit 501 configured to acquire a target face image in a video monitoring device;

a comparing unit 502 configured to compare the target face image with a first category image in a static library to obtain a first similarity value;

a judging unit 503 configured to determine whether there is a backup face image existed in the static library whose similarity with the target face image is greater than a second preset threshold, when the first similarity value is less than a first preset threshold;

the judging unit 503 further configured to determine whether a dynamic image corresponding to the backup face image is existed in a dynamic library, if the backup face image is existed in the static library;

a determining unit 504 configured to determine a match to be successful, if the dynamic image corresponding to the backup face image is existed in the dynamic library.

Understandably, the acquiring unit 501, the comparing unit 502, the judging unit 503 and the determining unit 504 can be configured to perform the method described in S101-S105.

Figure 6:
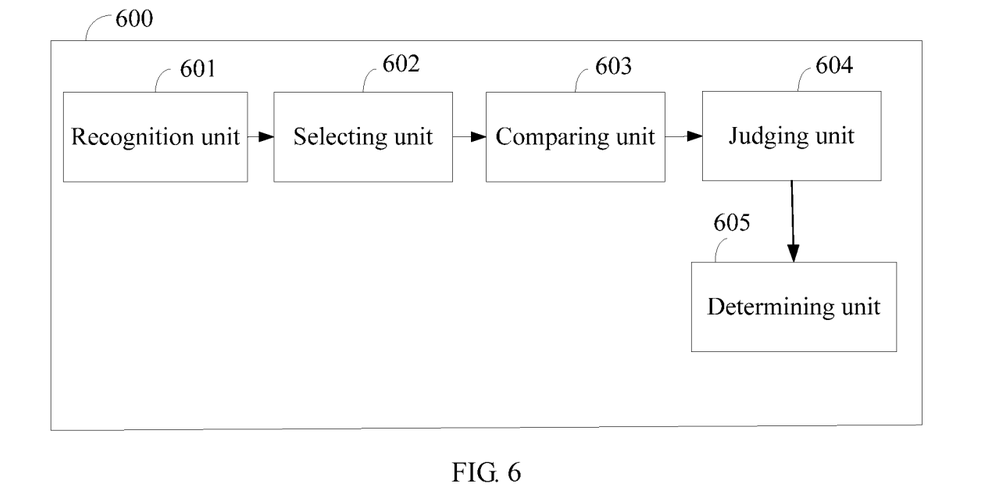
FIG. 6 is a block diagram of functional units of the apparatus for face recognition in accordance with a second embodiment of the present disclosure.

Referring to FIG. 6, an apparatus for face recognition 600 according to a second embodiment of the present disclosure, includes:

a recognition unit 601 configured to perform face recognition on a person when it is detected that the person appears in the video monitoring device;

it is understood that the person who is appeared can be random or a target character.

a selecting unit 602 configured to select one face, with a quality exceeding a preset threshold, from a plurality of recognized faces for feature extraction to obtain the target face image;

a comparing unit 603 configured to compare the target face image with a first category image in a static library to obtain a first similarity value;

a judging unit 604 configured to determine whether there is a backup face image existed in the static library whose similarity with the target face image is greater than a second preset threshold, when the first similarity value is less than a first preset threshold;

the judging unit 604 further configured to determine whether a dynamic image corresponding to the backup face image is existed in a dynamic library, if the backup face image is existed in the static library;

a determining unit 605 configured to determine a match to be successful, if the dynamic image corresponding to the backup face image is existed in the dynamic library.

Understandably, the recognition unit 601, the selecting unit 602, the comparing unit 603, the judging unit 604 and the determining unit 605 can be configured to perform the method described in S201-S206.

Figure 7:
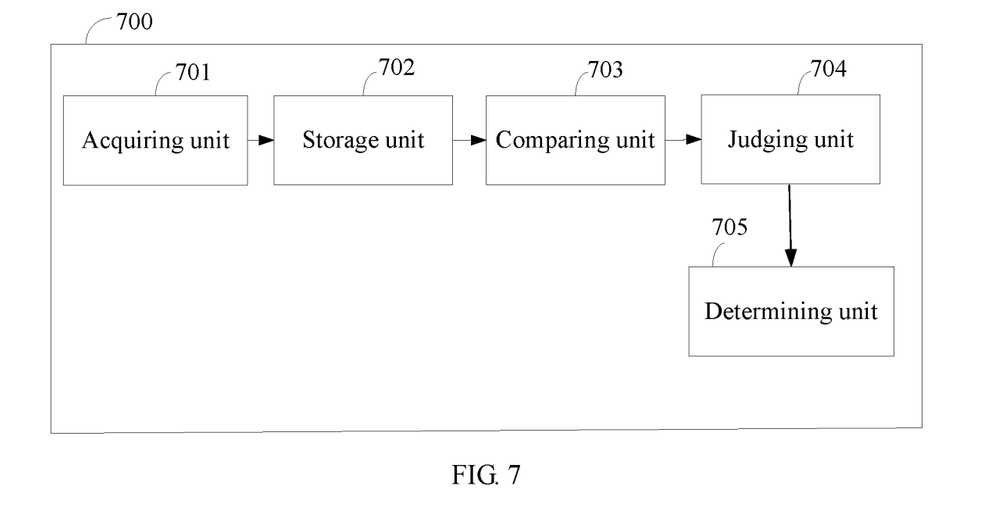
FIG. 7 is a block diagram of functional units of the apparatus for face recognition in accordance with a third embodiment of the present disclosure.

Referring to FIG. 7, an apparatus for face recognition 700 according to a third embodiment of the present disclosure, includes:

an acquiring unit 701 configured to acquire a dynamic image;

a storage unit 702 configured to store the dynamic image in a dynamic library;

wherein, a size of the face in the dynamic image is exceeded the first threshold and the face is positioned in a positive face posture. Furthermore, the positive face of the character in the dynamic image can last for at least N seconds, wherein N is a natural number greater than one. For example, N is two or three or four seconds and so on, which isn't limited in here.

the acquiring unit 701 further configured to acquire a target face image in a video monitoring device;

It is understandable that the video monitoring device can be installed in densely populated areas such as railway stations, airports, intersections and pedestrian streets. Of course, it can also be installed in hospitals, schools, governments and other places. The video monitoring device can be configured to upload recorded videos to the server periodically or irregularly. The apparatus for face recognition is played as an implementation body of the embodiment of the present disclosure, which can be configured to read videos from the server, of course, it can also directly be configured to receive the videos sent by the video monitoring device, and then obtain the target face image from the videos.

a comparing unit 703 configured to compare the target face image with a first category image in a static library to obtain a first similarity value;

a judging unit 704 configured to determine whether there is a backup face image existed in the static library whose similarity with the target face image is greater than a second preset threshold, when the first similarity value is less than a first preset threshold;

the judging unit 704 further configured to determine whether a dynamic image corresponding to the backup face image is existed in a dynamic library, if the backup face image is existed in the static library;

a determining unit 705 configured to determine a match to be successful, if the dynamic image corresponding to the backup face image is existed in the dynamic library.

Understandably, the acquiring unit 701, the storage unit 702, the comparing unit 703, the judging unit 704 and the determining unit 705 can be configured to perform the method described in S301-S306.

A readable storage medium according to an embodiment of the present disclosure is provided for storing computer programs for electronic data interchange, wherein the computer programs are performed by a computer to implement some or all steps of the method for face recognition above mentioned, and the computer includes a terminal.

A computer program product according to an embodiment of the present disclosure is provided and includes a non-instantaneous computer readable storage medium for storing computer programs, wherein the computer programs are performed by a computer to implement some or all steps of the method for face recognition above mentioned. The computer program product can be a software installation package, and the computer includes a mobile terminal.

What is claimed is:

1. A method for face recognition comprising:
acquiring a target face image in a video monitoring device;
comparing the target face image with a first category image in a static library to obtain a first similarity value;
when the first similarity value is less than a first preset threshold, determining whether there is a backup face image existed in the static library whose similarity with the target face image is greater than a second preset threshold;
if the backup face image is existed in the static library, determining whether a dynamic image corresponding to the backup face image is existed in a dynamic library;

if the dynamic image corresponding to the backup face image is existed in the dynamic library, determining a match to be successful.

2. The method for face recognition as claimed in claim 1, wherein the step of acquiring a target face image in a video monitoring device comprises:
   when it is detected that a person appears in the video monitoring device, performing face recognition on the person;
   selecting one face, with a quality exceeding a preset threshold, from a plurality of recognized faces for feature extraction to obtain the target face image.

3. The method for face recognition as claimed in claim 2, wherein the step of if the dynamic image corresponding to the backup face image is existed in the dynamic library, determining a match to be successful, comprises:
   if the dynamic image corresponding to the backup face image is existed in the dynamic library and a matching degree between the backup face image and the dynamic image is greater than a third preset threshold, determining the match to be successful.

4. The method for face recognition as claimed in claim 3, wherein a size of the face in the dynamic image is exceeded the first threshold and the face is positioned in a positive face posture.

5. The method for face recognition as claimed in claim 1, wherein the method further comprises:
   when the first similarity value is greater than the first preset threshold, determining the match to be successful;
   determining information of the person in the target face image according to the matched face image, and outputting the information of the person in the target face image.

6. An apparatus for face recognition comprising:
   an acquiring unit configured to acquire a target face image in a video monitoring device;
   a comparing unit configured to compare the target face image with a first category image in a static library to obtain a first similarity value;
   a judging unit configured to determine whether there is a backup face image existed in the static library whose similarity with the target face image is greater than a second preset threshold, when the first similarity value is less than a first preset threshold;
   the judging unit further configured to determine whether a dynamic image corresponding to the backup face image is existed in a dynamic library, if the backup face image is existed in the static library; and
   a determining unit configured to determine a match to be successful, if the dynamic image corresponding to the backup face image is existed in the dynamic library.

7. The apparatus for face recognition as claimed in claim 6, wherein the acquiring unit is configured to perform face recognition on a person, when it is detected that the person appears in the video monitoring device, and select one face, with a quality exceeding a preset threshold, from a plurality of recognized faces for feature extraction to obtain the target face image.

8. The apparatus for face recognition as claimed in claim 7, wherein the determining unit is configured to determine the match to be successful, if the dynamic image corresponding to the backup face image is existed in the dynamic library and a matching degree between the backup face image and the dynamic image is greater than the third preset threshold.

9. The apparatus for face recognition as claimed in claim 8, wherein a size of the face in the dynamic image is exceeded the first threshold and the face is positioned in a positive face posture.

10. The apparatus for face recognition as claimed claim 6, wherein the apparatus further comprises an output unit;
    the determining unit further configured to determine the match to be successful when the first similarity value is greater than the first preset threshold, and determine information of the person in the target face image, according to the matched face image; and
    the output unit configured to output the information of the person in the target face image.

* * * * *